United States Patent [19]
Fosse et al.

[11] 3,948,354
[45] Apr. 6, 1976

[54] LUBRICATOR FOR CONCRETE PIPE VIBRATORS

[75] Inventors: Marvin D. Fosse; William M. Montgomery, both of Nashua, Iowa

[73] Assignee: Hydrotile Machinery Company, Nashua, Iowa

[22] Filed: Sept. 18, 1974

[21] Appl. No.: 507,064

[52] U.S. Cl. .............. 184/6.22; 74/61; 425/432; 425/456; 259/DIG. 42; 184/6.16
[51] Int. Cl.² ........................................ F16N 7/18
[58] Field of Search ............... 425/432, 456, 262; 259/DIG. 42; 74/61; 184/6, 6.16, 6.22, 65

[56] References Cited
UNITED STATES PATENTS

| | | |
|---|---|---|
| 2,332,882 | 10/1943 | Abbatiello ........................ 184/6.22 |
| 3,114,360 | 12/1963 | Snelling ............................ 184/6.22 |
| 3,177,554 | 4/1965 | Larkfeldt ..................... 259/DIG. 42 |
| 3,188,054 | 6/1965 | Mason .......................... 259/DIG. 42 |
| 3,664,461 | 5/1972 | Leffers ............................... 184/6.16 |
| 3,752,626 | 8/1973 | Trautner ............................. 425/262 |
| 3,804,202 | 4/1974 | Funke ............................... 184/6.16 |
| 3,850,580 | 11/1974 | Moore .......................... 259/DIG. 42 |

*Primary Examiner*—Paul E. Shapiro
*Assistant Examiner*—Marvin Siskind
*Attorney, Agent, or Firm*—Burd, Braddock & Bartz

[57] ABSTRACT

A vibrating system for concrete pipe-making machines incorporating a pressurized lubricating system for the bearings of the vibrator in which oil is drawn from a reservoir and pumped to the bearings and is then returned to the reservoir, the reservoir being provided with a water jacket for cooling the oil.

35 Claims, 3 Drawing Figures

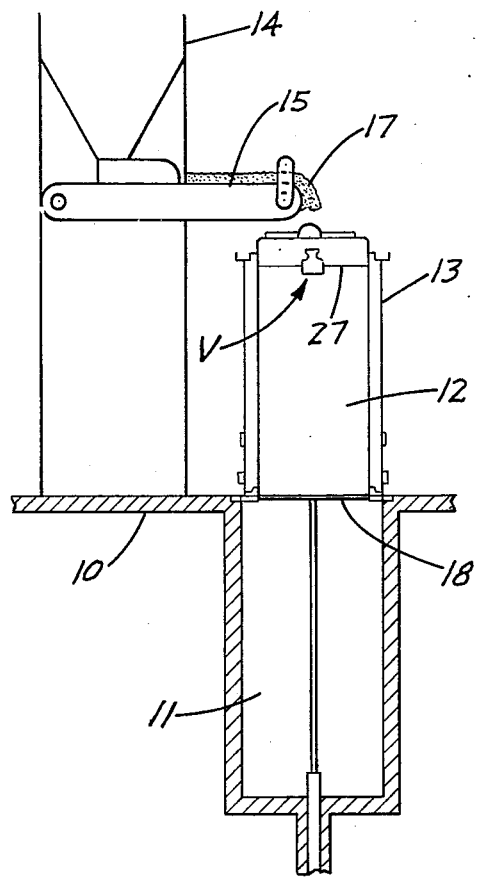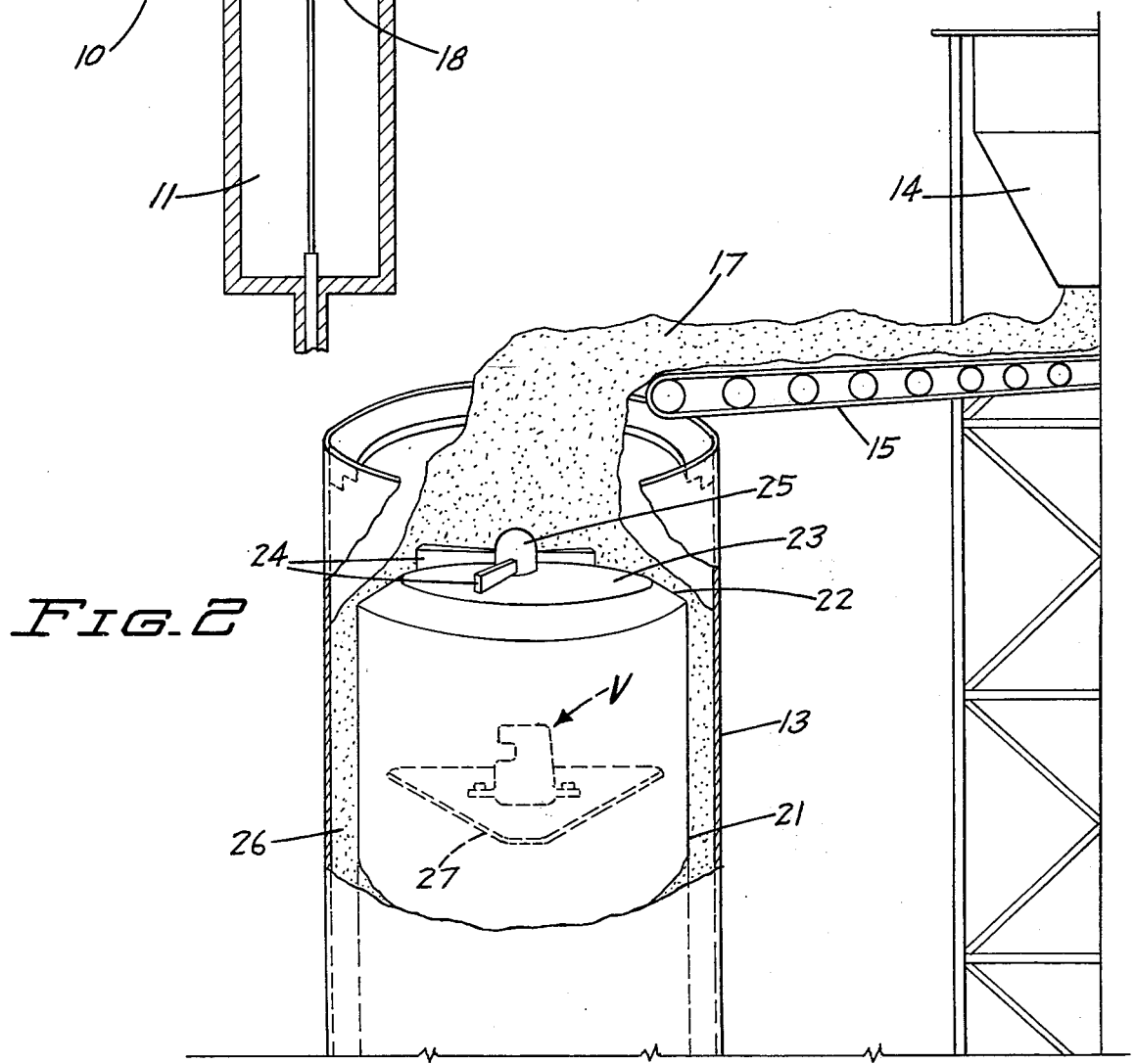

LUBRICATOR FOR CONCRETE PIPE VIBRATORS

This invention relates to novel machines and methods for vibrating devices used in the concrete pipe-making industry, although the scope of the invention is not specifically limited to that industry.

In the manufacture of concrete pipe products, it has been found that a better quality product having uniform characteristics and greater strength throughout is obtained by consolidating the freshly poured concrete by vibrating same immediately after it is poured.

The concrete is poured between the inner and outer walls of the mode. In some instances the outer wall or jacket is vibrated, in some situations the inner wall or core is vibrated, and in other situations both walls are vibrated.

Various vibrating means have been used in the past, including high frequency vibrators mounted on the outer wall and driven by electric motors, the use of pulsating hydraulic pressure on both the interior and exterior walls, and motor driven vibrations connected with the interior wall or core.

One of the serious problems associated with these vibrations is the frequency with which they break down and require repairing or replacing. This is especially true of the vibrators used to vibrate the interior wall. Investigation of this problem indicates that the vibrators are not being properly lubricated, and that the lubricants are functioning at excessively high temperatures, particularly the interior wall vibrators, which are operating in confined areas with inadequate ventilation.

Therefore, an object of this invention is to provide an improved vibrating system which will have longer life, increased efficiency, and fewer breakdowns.

Another object is to provide an improved vibrating system which is especially suitable for use in situations where natural or pneumatic cooling is impossible or impractical, and is especially suited for use with the cores of concrete pipe-making machines.

Still another object is to provide a vibrating system with forced hydraulic lubricating system which assures an adequate supply of lubricant at all times for the lubricated parts.

In machines presently in existance, the vibrators have bearings which wear out very quickly. The life of the bearings and the vibrating devices themselves can be materially increased by the use of a forced lubricating system for the bearings, and the life of the vibrator and/or its components can be extended ever further by use of cooling means to keep the lubricant at a low enough temperature so as to maximize the life of the vibrator bearings.

In one preferred form of the invention, a centrifugal pump is used to withdraw oil from a reservoir and pump same through a series of conduits to the bearings of the vibrator, the oil after lubricating the bearings then being returned through a return conduit system to the reservoir, the reservoir being enclosed by a water jacket to withdraw the heat therefrom, and thereby cool same, the pump and the vibrator itself serving as a means of stirring the oil reservoir so as to promote the rapid cooling of the lubricant.

Thus, another basic object of this invention is to provide novel and effective means for substantially increasing the life of interacting metallic surfaces such as bearings by lubricating them in a recirculating lubricating system which is designed so as to maintain the temperature of the lubricant at a substantially predetermined temperature which constitutes the most efficient and effective temperature for the particular lubricant when taking into account the nature of the surfaces to which it is to be applied and the cost and efficiency of the system itself.

A further object is to provide a lubricating system with temperature controls for the lubricant which enable the lubricant to continuouly function at its optimum temperature with respect to the parts to be lubricated.

One of the broad concepts of this invention is the use of a coolant such as water to cool a lubricant such as oil before it is pumped or recycled to the bearings or other moving surfaces which it is intended to lubricate.

The temperature of the lubricant must be maintained at a temperature which will permit it to have maximum lubricating qualities while at the same time maintaining a viscosity which does not make it too difficult for the pump to handle and force through the system, and which is also at a viscosity which provides maximum lubricating qualities for the particular surfaces which it is intended to lubricate.

If the lubricant is maintained at too low a temperature, it will be difficult for the pump to handle the lubricant and force it through the system, thereby substantially reducing the life of the pump. Also, if the lubricant is too viscous, it reduces its lubricating efficiency in so far as lubricating the parts with which it is intended to work. Thus, the particular temperature which it is sought to maintain in this system will depend in large part upon the particular type of lubricant to be utilized, the type of surfaces to be lubricated, and the type of system which must handle the lubricant and finally, the nature and efficiency of the cooling system itself.

These and other objects will be more readily appreciated from a study of the drawings and the accompanying description in which:

FIG. 1 is a schematic view of a concrete pipe-making system embodying one preferred form of this invention;

FIG. 2 is a perspective view of the upper part of the core, jacket, feeder and the vibrator of the system of FIG. 1.

Figure 3:
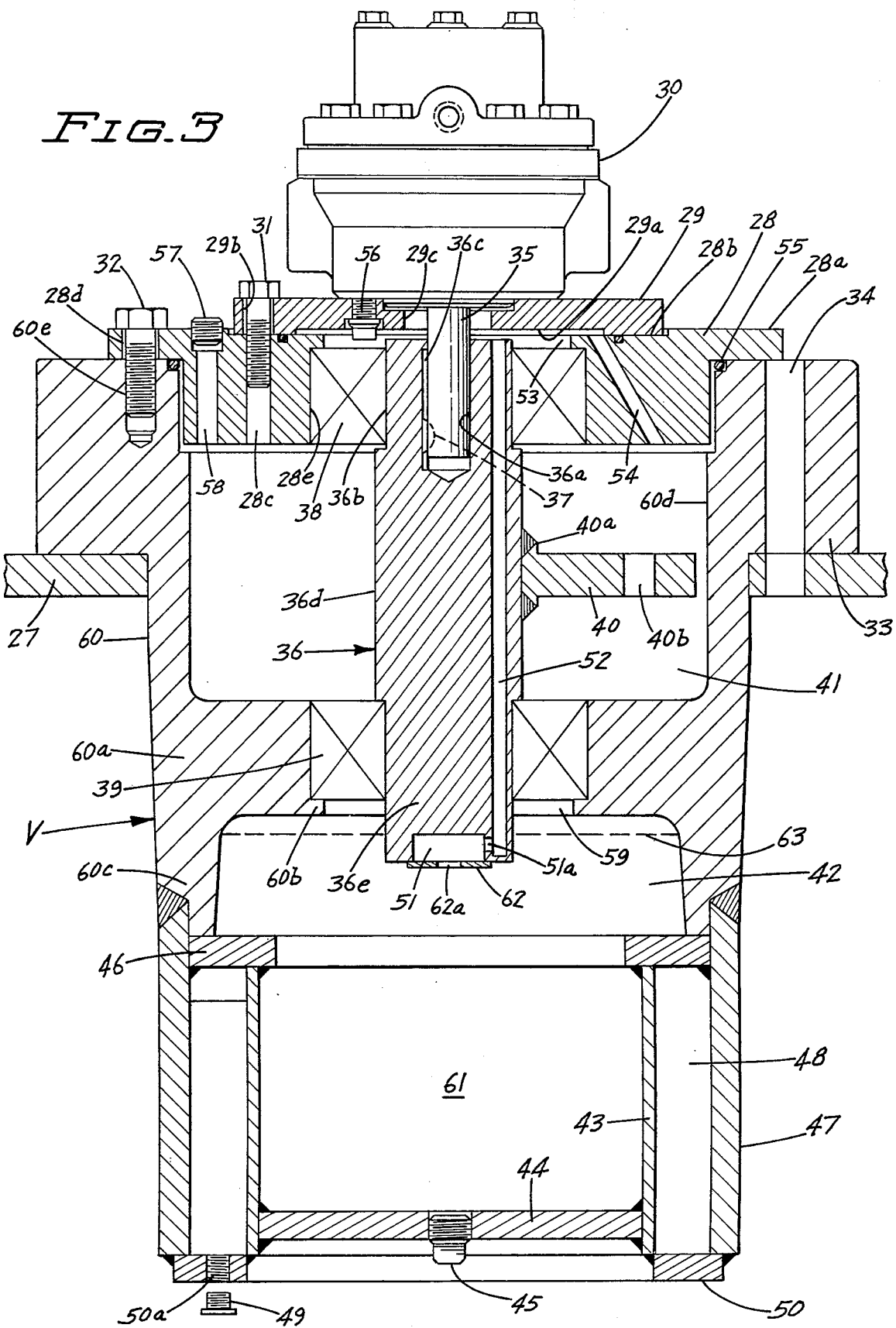
FIG. 3 is a vertical cross sectional view through the vibrating system itself.

Referring now to the drawings, and specifically to FIG. 1, that particular figure shows a pipe-making system which includes a basic supporting structure 10 forming a well or cavity 11 into which a core 12 is movable vertically downwardly to start the pipe forming operation in a manner to be described in more detail hereinafter. The supporting structure also supports a mold jacket or outer wall 13. A feed system including a hopper 14 and a conveyor 15 is mounted avove the jacket and core to systematically feed wet concrete 17 into the pipe-making mold defined by the core and jacket. The core is moved up and down by means of a supporting plate or elevator 18 powered by the rod 19 of a hydraulic cylinder 20. The vibrator V of this invention is mounted inside the core 12.

Considering next the structure illustrated in FIG. 2, the core 12 includes a cylindrical wall 21 having a tapered shoulder 22 which is connected to a top plate or cover 23 on which is mounted a plurality of paddles 24 driven by a motor 25, the paddles being designed to receive concrete from the over-head conveyor 15 and throw same laterally into the annular space 26 between the core wall 21 and the outer jacket 13 to form the cement pipe walls therebetween.

The vibrator V has a supporting plate 27 which is secured to the core wall 21 in such a fashion that when the plate itself is vibrated by the vibrator of this invention, that the vibrations will be transmitted through the plate to the core so that the concrete will be consolidated through the vibrations, both while the concrete is on the core cover 23 as well as during its feed into annular space 26 between the core wall and the jacket, and during its settling and shaping therein.

Referring to FIG. 3 particularly, the vibrator V of this invention includes a vibrator case 60 which supports a flow vibrator top bearing retainer 28 having a flange 28a which overlies and is supported by the upstanding annular wall 60d of the case. The retainer 28 has an upwardly facing annular recess 28b which receives and supports a hydraulic motor supporting plate or flange 29 having a downwardly facing circular recess 29a which in turn supports a hydraulic motor 30, said flange being secured to said retainer 28 by means of cap screws 31 which extend through the vertical openings 29b of the mounting plate 29 and are threadedly engaged with vertical threaded openings 28c in the retainer, the retainer itself being secured to the vibrator case 60 by cap screws 32 extending through vertical openings 28d in the flange 28a and threadedly engaged with vertical threaded opening 60e in the case. The vibrator case itself has an annular mounting flange 33 which has openings 34 formed therein for receiving suitable fastening members (not shown).

The hydraulic motor 30 has a depending motor shaft 35 which extends into and is seated in a vertical opening 36a of the reduced end portion 36b of vibrator shaft 36, the shaft 35 extending through a central opening 29c in the motor mounting plate. The shaft 35 is secured to the vibrator shaft 36 by means of a woodruff key 37 installed in keyway 36c of the vibrator shaft.

The reduced portion 36b of shaft 36 rides in an upper bearing assembly 38 which is seated in a central annular recess 28e of the retainer and is supported by the retainer plate 28 and the shoulder between the reduced portion 36b and the larger central main body portion 36d of the vibrator shaft. The vibrator shaft 36 is supported at its reduced lower end 36e by means of a bearing assembly 39, the lower bearing assembly 39 being supported by the annular shoulder 60b of an internal annular ledge 60a of the vibrator case, the shoulder between the larger central part 36d and the reduced end 36e resting on bearing 39.

The vibrator shaft 36 has an eccentric arm 40 secured thereto as by weldments 40a to set up the desired vibrations in the system. The eccentric arm has an opening 40b formed therein for the securement of additional weight (not shown) thereto if desired. The eccentric arm 40 rotates in a chamber 41, which chamber 41 is disposed between the retainer plate 28 and the case annulus 60a. The eccentric chamber 41 is further defined by the case wall structure 60d, and is in communication with both the upper and lower bearing assemblies 38 and 39, whereby a fluid such as a lubricant can travel through chamber 41 to the lower bearing 39 from the upper bearing 38 or any other source of lubricant. The main body portion of the retainer 28 seats in an annular recess 60d' of the wall 60d. The annulus 60a and the shoulder 60b define an annular recess which receives the lower bearing.

The lower part of the vibrator case has a depending annular ring or skirt 60c which defines another chamber 42 which forms the upper part of the lubricant reservoir. The chamber 42 communicates with the chamber 41 and the lower bearing through the central opening 59 in the case defined by annulus 60a and shoulder 60b. The lower part of the lubricant reservoir is defined by annular interior wall structure 43, a bottom wall or floor 44 having a drain plug 45, the wall 43 and the floor 44 defining a chamber 61 in which the major portion of the lubricant is confined. The sump wall is connected with a horizontal annular ring 46 which has a central opening therein which provides communication between the chambers 42 and 61 to thereby provide one large oil or lubricant reservoir, the opening defined by ring 46 thus becoming a part of said reservoir. The sump wall 43 is enclosed by a concentric outer wall or jacket 47 which defines an annular cooling space 48 which is adapted to contain a coolant such as water, the water being admitted to and drained from the cooling space 48 by means of a drain plug 49, the plug 49 being installed in the opening 50a formed in the annular ring 50 which connects the lower ends of the walls 43 and 47 to thereby provide a closed sealed annular cooling space, the rings 46 and 50 closing and sealing the top and bottom respectively of the annular space 48, the various parts defining the chamber 61 being connected in any suitable manner, such as by welding.

A centrifugal pump 51 is mounted on the lower end of shaft 36 and is adapted to draw oil upwardly from the reservoir through opening 62a in closure plate 62 and pump it laterally to the bearing assemblies 38 and 39 through a lateral opening 51a and then conduit 52 formed in the shaft itself, and extending longitudinally thereof, the conduit 52 carrying the oil virtually the full length of the shaft and discharging it from the top thereof into the space 53 immediately above the top bearing 38 and constituting the remainder of the area defined by the center opening of retainer 28 which is not occupied by the bearing, said space 53 being in communication with the space immediately above it defined by recess 29a, the oil then flowing by gravity on to the upper bearing assembly. The oil passes through the upper bearing assembly and is discharged therefrom into the eccentric chamber 41, and falls through said chamber 41 on to the lower bearing assembly 39. Surplus oil is bled off from the chamber 53 through an over flow conduit 54 formed in the retaining plate 28, conduit 54 extending entirely through retainer 28 and providing communication between the area defined by recess 29a and chamber 41.

An O-ring gasket 55 is interposed between the retainer plate 28 and the wall 60d of vibrator case 27 to form a proper seal between the respective parts, the O-ring being seated in a recess in the interior corner of 60d. Cap screws 56 are used to secure the hydraulic motor to the plate 29. A plug 57 is installed in the retainer plate 28, the plug 57 removably closing a fill opening 58 formed in the retainer plate to permit the addition of oil or other lubricant to the system whenever it runs low, and extending entirely through the retainer 28 from the top to the bottom thereof.

It has been found that the system is most effective when the pump 51 is submerged in the oil only a short distance such as illustrated in the drawings so that the pump is essentially just below the upper surface 63 of the oil in the reservoir.

The oil that is admitted to the chamber 41 flows to and on the lower bearing 39 to lubricate same, and after it has lubricated the lower bearing 39, it falls from the lower bearing through the opening 59 and thereby returns to the upper portion 42 of the oil reservoir or sump.

The action of the pump serves to agitate and mix the oil in the reservoir to maximize the cooling thereof.

In general operation of the system itself, the outer form or jacket 13 is placed on the machine, and the core 12 is installed in the well 11 and raised until the bottom of the core taper 22 is even with the bottom of the mold.

The operator then moves the feeding belt 15 into position over the interior of the mold and the top of the core, starts the concrete distributor such as the paddles 24 on top of the core and starts the concrete feeder belt 15. As soon as the core is covered with concrete, he starts the core vibrator V.

The wet concrete is thrown laterally by the blades 24 into the mold space 26 and is consolidated by the vibrations of the vibrator V which are caused by the rotation of the eccentric arm 40, said vibrations being transmitted through the case 60 to the plate 27, and thence to the wall of the core facing and in contact with the wet concrete.

The operator causes the core to move upwardly as the form fills and the concrete consolidates. The rate at which the vibrator will consolidate the concrete will depend on the workability of the concrete mix being used. However, the rate is such that it eliminates soft spots and results in a product of uniform density and strength.

As the core's taper approaches the top of the form, the core is slowed in order to give the core taper an opportunity to assist the vibrator in consolidating the upper end of the product.

After the core taper passes the top of the mold, the distributor and vibrator are shut off, the core is completely removed from the mold and the outer form and product are removed and sent to the kiln for stripping, and then returned for the next cycle.

In the operation of the vibrator itself, the lubricant reservoir is filled with a suitable lubricant such as oil through the fill opening 58 until the level in the reservoir reaches line 63.

A cooling liquid such as water is installed in the space 48. Any suitable means (not shown) may be used to pump the water into and out of the jacket space 48.

The motor drives shaft 36 and its eccentric arm 40. Rotation of the shaft causes the pump to operate, drawing oil from the reservoir through opening 62a and discharging it laterally through opening 51a into conduit 52, where it is pumped vertically through shaft 36, emerging from the top of the shaft into area 53.

The oil free falls from the top of shaft 36 unto the top bearing 38, and works its way downwardly therethrough by gravity and then falls by gravity through the eccentric chamber 41 unto lower bearing 39, where it again works its way downwardly by gravity through the lower bearing and free falls therefrom through the opening 59 into the sump for cooling and recycling.

Excess oil discharged from conduit 52 is withdrawn from recess 29a through conduit 54, and it also falls by gravity through chamber 41 onto the lower bearing, and then back to the sump for cooling and recycling.

Coolant such as water is preferably continuously passed through the space 48 of the water jacket to withdraw heat from the sump and maintain a desired temperature for the oil in the sump.

The agitation of the oil in the sump promoted by the pump 51 increases and maximizes the cooling of the oil, and helps to maintain a more uniform and constant oil bath temperature.

It will thus be appreciated that the lubricant is maintained at a substantially constant temperature which temperature is, as previously indicated, that which maximizes the lubricating capabilities of the oil thereby maximizing the life of the bearings. The lubricating system described is a continuous one in that the lubricant is not only continuously being sent from the reservoir to the bearings, but is also continuously being recycled back into the reservoir and cooled. Although the lubricant is pumped upwardly through a relatively narrow single conduit 52, the volume of lubricant is such combined with the centrifugal action of the rotating shaft 36 that the lubricant is distributed uniformly around the entire circumference of the upper bearing 38 and thereupon falls relatively uniformly around the entire circumference of the lower bearing 39. Furthermore, although a single conduit 52 is illustrated, it will be appreciated that other designs may be developed within the scope of this invention which could embody a plurality of these conduits.

It will also be understood that although the particular vibrating system herein illustrated utilizes only two sets of bearings, that the concepts of this invention can also be applied to a single bearing or to a system embodying more than two bearings. It will also be understood that different styles and types of sumps or lubricant reservoirs can be utilized so long as it is large enough to maintain an adequate supply of lubricant between periodic maintenance checkups of the system.

It is conceivable that a system can also be designed within the scope of this invention in which the nature of the particular process in which the device is being used combined with the quantity of lubricant may permit of successful use without any forced cooling of the oil reservoir. Thus, in a given situation, the amount of heat generated might be low enough so that when the used heated oil is returned to the reservoir that the total temperature increase of the entire bath would be so slight that natural cooling through exposure of the sump wall directly to the surrounding atmosphere might provide adequate cooling.

However, in most applications such as the concrete pipe-making art herein described, it is anticipated that some type of artifical cooling will be necessary such as the one illustrated and described herein.

It will also be understood that the cooling system is not necessarily limited to any particular type of coolant and the character of the cooling fluid may be either liquid or gaseous. It will be further appreciated that the vibrating system may be operatably connected to the mold by means other than the plate 27 and that, in fact, the entire vibratory system may be utilized in fields other than the concrete pipe-making art.

Regardless of what particular art the system is used in, it will be readily recognized that the pressurized lubricating system operating in conjunction with a temperature controlled reservoir enables the bearings or other parts to be lubricated to be constantly lubricated by a lubricant having the optimum temperature so that the bearings can operate at peak efficiency for the maximum life span for which they were designed. In fact, that might very well last even longer than the design life because the system may be substantially more efficient than what the designers and manufacturers anticipated as being available when the bearings were designed. This extension of the life of the bearings is important not only because of the savings affected in the cost of the bearings themselves, but perhaps more importantly a greater value can be attributed to the minimizing of the down-time required to periodically replace the bearings when they wear out or malfunction, since the cost of the labor required to install new bearings and the reduction in the number of concrete pipes or other products being made in the system are normally encountered expenses which can be reduced or eliminated by use of this invention.

The invention may be embodied in other specific forms and it is to be understood that various changes may be made by those skilled in the art without departing from the spirit of the invention and the invention as set forth herein is to be considered in all respects as illustrative and not restrictive, the scope of the invention being indicated by the appended claims rather than the foregoing description and all changes which come within the meaning and range of equivalency of the claims and, therefore, to be embraced therein.

Although a specific embodiment and one preferred form of the invention has been described as applied to the concrete pipe-making field, it will be appreciated that the invention is not necessarily limited thereto, and can find applicability in other fields of endeavor in a form different from that shown, but embodying the same principles.

It will also be noted that the invention involves not only a novel vibrating mechanism, but also a novel method of lubricating a vibratory system, particularly one involved in the making of concrete pipe.

Although the invention as described involves the lubrication of bearings, it will be understood that it is also applicable to the lubrication of parts other than bearings.

Generally, the environment in devices for making concrete pipe is such that the lubricant gets overheated, and needs cooling. However, it is recognized that the environment could be such that the lubricant would have to be heated, rather than cooled, to maintain it at its most effective temperature and viscosity, and therefore, the temperature controlling system of the lubricant reservoir may either be adapted to cool or heat the reservoir, depending on the circumstances and particular use to which the invention is put.

There may also be circumstances within the scope of the invention where the lubricant may travel from the reservoir to the part by gravity, and then be recycled to the reservoir by the pump. There may also be a single part or bearing to be lubricated, or there may be more than the two illustrated with the closed or predetermined path of travel of the lubricant so as to be subjected to its lubricating qualities during the cause of its travel through the system.

The vibratory system need not necessarily be enclosed in a cover or cylinder, and might well be mounted externally of the device which is to be vibrated thereby.

The oil that drains from the upper bearing may also be collected and delivered in a more controlled fashion to the bearings below, rather than permitting the free-fall method as illustrated, when it is more desirable to operate in that fashion.

Depending on the particular application, the overflow or bypass line 54 may be more than a mere overflow, and may serve as a means of getting fresh lubricant to the lower bearing, rather than relying primarily on drainage of used oil from the upper bearing onto the lower bearing. Thus, the pump can be designed to pump enough oil for two bearings, with half going directly to the upper bearing, and the other half going directly to the lower bearing through the bypass channel 54, or oil can be pumped directly to each of the bearings.

Eccentric chamber 41 is so designed that all oil which enters it must ultimately fall to the bottom and be directed to the lower bearing, so that all oil can only leave chamber 41 by passing through the lower bearing. To this end, the top surface of 60a (which defines the bottom wall or floor of chamber 41) is preferably inclined inwardly slightly to promote drainage towards the lower bearing.

The rotary movement of the eccentric arm 40 intercepts at least part of the oil falling from bypass 54 and from the upper bearing and throws it laterally against the vertical side walls defining chamber 41, thereby contributing to the uniform disbursement of the oil around the entire circumference of the lower bearing.

Also, in some circumstances, it may be desirable not to recycle the oil, in which case means may be provided for draining the used oil to some collection facility, rather than returning it to the reservoir.

The embodiment of the invention in which an exclusive property or privilege is claimed are defined as follows:

1. A vibrator system comprising:
    a vibrating mechanism including motor means and shaft means rotatable about a vertical axis and driven by said motor means;
    upper and lower bearing means in which said shaft rotates,
    a reservoir located below the bearing means adapted to hold a lubricant,
    a first chamber disposed above said upper bearing means,
    conduit means for transferring lubricant from said reservoir to the first chamber,
    a second chamber disposed below said upper bearing means and in communication with said lower bearing means,
    eccentric means located in and operating in said second chamber, and
    pump means for pumping a lubricant from said reservoir through said conduit means to said first chamber where lubricant is caused to fall over the upper bearing means, through said second chamber, over said lower bearing means and back to the reservoir.

2. The vibrator system of claim 1, including means for controlling the temperature of said lubricant.

3. The vibrator system of claim 2, wherein said means for controlling the temperature of said lubricant includes means for cooling said lubricant.

4. The vibrator system of claim 2 including:
    a jacket for said reservoir,
    and temperature control means in said jacket.

5. The vibrator system of claim 4, wherein said temperature control means is a fluid.

6. The vibrator system of claim 5, including means for circulating said fluid in said jacket.

7. The vibrator system of claim 4, including means for agitating said lubricant while in said reservoir.

8. The vibrator system of claim 1 wherein said pump means comprises centrifugal pump means for delivering lubricant to said first chamber.

9. The vibrator system of claim 1 wherein
at least a portion of the operative parts of said pump means being submerged in lubricant in said reservoir.

10. The vibrator system of claim 1, wherein said pump means is operatively connected to and driven by said shaft.

11. The vibrator system of claim 10, wherein said pump means is connected to said shaft for simultaneous rotation therewith,
said pump means being located in said reservoir and adapted to draw lubricant directly therefrom in direct response to rotation of said shaft.

12. The vibrator system of claim 1, including a cylindrical structure enclosing said system,
and means connecting said cylinder with said vibrating mechanism whereby the vibrations caused by said mechanism are transmitted through said connecting means to the side walls of said cylindrical structure to cause said side walls to vibrate.

13. The vibrator system of claim 12, wherein said cylindrical structure is the vertically movable portion of a concrete pipe-making device,
said device also including an outer jacket enclosing said cylindrical structure,
said jacket and cylindrical structure defining an annular space therebetween for forming a pipe wall therebetween,
and means for feeding fluid concrete into said annular space while said side walls are vibrating to form the walls of said concrete pipe.

14. The vibrator system of claim 1, wherein said pump means is a centrifugal pump, at least a portion of which is submerged in the lubricant in said reservoir.

15. A vibrator assembly including:
a vibrating mechanism having motor means and shaft means rotatable about a vertical axis and driven by said motor means,
upper and lower bearing means in which said shaft rotates,
a reservoir below the lower bearing means adapted to hold a lubricant,
conduit means for transferring lubricant from said reservoir to the upper bearing means,
pump means for pumping a lubricant from said reservoir through said conduit means to said upper bearing means,
said pump means being connected to said shaft for simultaneous rotation therewith and being partially located in said reservoir adapted to draw lubricant directly therefrom in direct response to rotation of said shaft,
said lower bearing means being positioned to receive lubricant from said upper bearing means by gravity flow as lubricant returns to the reservoir.

16. The vibrator system of claim 15, including eccentric means operatively connected with said shaft and adapted to effect vibration in said system.

17. The vibrator system of claim 16, wherein said eccentric means includes a member extending laterally from said shaft,
said member being disposed between said upper and said lower bearing means.

18. The vibrator system of claim 15, wherein said conduit means includes a channel formed in said shaft and extending longitudinally thereof,
one end of said channel being in communication with said pump means and receiving lubricant therefrom,
the other end of said conduit means being located above said upper bearing means whereby said lubricant flows by gravity from the upper end of said channel to said upper bearing means.

19. The vibrator system of claim 15, including a first chamber disposed above said upper bearing means and adapted to receive the lubricant from said conduit means and cause same to move by gravity onto said upper bearing means.

20. The vibrator system of claim 19, including a second chamber disposed below said first chamber and said upper bearing means,
said second chamber communicating with said lower bearing means.

21. The vibrator system of claim 20, including a by-pass channel extending between and communicating with said first chamber and second chamber and adapted to transfer excess lubricant from said first chamber to said second chamber,
said second chamber and said lower bearing means being so related with respect to each other that lubricant entering said second chamber will flow by gravity through said second chamber into said lower bearing means.

22. The vibrator system of claim 20, including eccentric means located in and operating in said second chamber.

23. The vibrator system of claim 15, wherein said pump means is a centrifugal pump.

24. The vibrator system of claim 15, including means for cooling the lubricant in said reservoir.

25. The vibrator system of claim 24, wherein said cooling means comprises cooling chamber means surrounding and in contact with said reservoir,
and a coolant in said cooling chamber means for withdrawing heat from said reservoir.

26. A vibrator system, including: body structure defining at least in part a cylindrical chamber,
means for connecting said body structure with structure to be vibrated,
a first supporting plate mounted on said body structure and enclosing the top of said chamber,
a mounting plate mounted on and supported by said supporting plate,
motor means mounted on the support by said mounting plate,
a central opening in said supporting plate,
a rotatable shaft driven by said motor means, said shaft extending downwardly through said central opening,
bearing means interposed between said shaft and said supporting plate, and located at least in part in said central opening,
lower bearing means supported by said body structure and interposed between said shaft and said body structure,
an eccentric member operatively connected to said shaft between said upper and lower bearing means and movable in said chamber,
said body structure further defining a reservoir below said shaft,
said shaft extending into said reservoir, a lubricant in said reservoir, a centrifugal pump forming a part of the lower end portion of said shaft and disposed in said reservoir in a manner to draw lubricant from said reservoir, vertical conduit means formed in said shaft, said conduit having a lower end adapted to receive lubricant from said pump and convey same upwardly, said conduit having an upper discharge opening adapted to discharge lubricant into said central opening above said upper bearing means whereby said lubricant moves by gravity flow onto said upper bearing means, a bypass channel extending between and communicating with said channel opening and said chamber for conveying excess lubricant from said opening around said bearing means to said chamber, said bypass lubricant being adapted to flow by gravity through said chamber to said lower bearing means, said lower bearing means being in communication with said reservoir whereby lubricant falling from the bottom thereof is returned to said reservoir, an annular chamber surrounding said reservoir and in direct communication with the wall structure defining said reservoir, and a coolant in said annular cooling chamber for withdrawing heat from said reservoir and cooling said lubricant.

27. The vibrator system of claim 26, including an opening formed in said supporting plate communicating with said chamber for adding a lubricant to the system, and closure means for said opening.

28. The vibrator system of claim 26, including a cylindrical core constituting part of a concrete pipe-making system and constituting said structure to be vibrated, said vibrating system being located interiorly of said core, the means connecting said body structure to said structure to be vibrated comprising plate means secured to said body structure and said core structure in such a manner that any vibration imposed on said body structure will be transmitted to said plate structure and from thence to said core structure in a manner to cause vibration of said core structure.

29. A vibrator assembly comprising:

a housing;

a generally upright rotatable shaft having eccentric means to produce vibration upon rotation of the shaft;

bearing means in which said shaft rotates;

said housing providing a lubricant fluid reservoir located below the bearing means;

pump means partially located in the reservoir and connected to the shaft to deliver lubricant fluid from the reservoir to a location above the bearing means and permit lubricant fluid to flow downward under the influence of gravity back to the reservoir; and cooling means operatively associated with said reservoir to cool lubricant fluid in the reservoir;

said cooling means comprises outside wall means located around the reservoir forming a jacket to accept circulating cooling fluid;

said pump is connected to said shaft for simultaneous rotation therewith, said pump means being located partially in said reservoir and adapted to draw lubricant fluid directly therefrom in direct response to rotation of said shaft.

30. The vibrator assembly of claim 29, wherein: said eccentric means includes a member extending laterally from said shaft.

31. The vibrator assembly of claim 29 wherein: said pump means extends from said shaft to the reservoir, a first chamber located above the bearing means, a conduit passing through said pump and said shaft to the first chamber, said pump including a pump opening in the end of the shaft and positioned in said reservoir, a closure plate having a downwardly open inlet opening closing said pump opening, and a lateral opening to said conduit from said pump opening whereby lubricant fluid enters the pump opening through said inlet opening and under centrifugal force upon rotation of the shaft is forced through said lateral opening and up said conduit for discharge into said first chamber whereby lubricant fluid moves under the influence of gravity from the first chamber over the bearing means and back to the reservoir.

32. The vibrator assembly of claim 31 wherein: said cooling means comprises outside wall means located around the reservoir forming a jacket to accept circulating cooling fluid.

33. A vibrator assembly comprising:

a housing;

a generally upright, rotatable shaft having eccentric means to produce vibration upon rotation of the shaft;

bearing means in which said shaft rotates;

said housing providing a lubricant fluid reservoir located below the bearing means;

a first chamber located above the bearing means;

pump means partially located in the reservoir and connected to the shaft to deliver lubricant fluid from the reservoir to the first chamber and permit the lubricant fluid to flow downward under the influence of gravity over the bearing means and back to the reservoir;

said pump means extending from said shaft to said reservoir, a first chamber located above the bearing means, a conduit passing through said pump and said shaft to the first chamber, said pump including a pump opening in the end of the shaft and positioned in said reservoir, a closure plate having a downwardly open inlet opening closing said pump opening, and a lateral opening to said conduit from said pump opening whereby lubricant fluid enters the pump opening through said inlet opening and under centrifugal force upon rotation of the shaft is forced through said lateral opening and up said conduit for discharge into said first chamber whereby lubricant fluid moves under the influence of gravity from the first chamber over the bearing means and back to the reservoir.

34. The vibrator assembly of claim 33 including: cooling means operatively associated with said reservoir to cool lubricant fluid located in the reservoir.

35. The vibrator assembly of claim 34 wherein: said cooling means comprises outside wall means located around the reservoir forming a jacket to accept circulating cooling fluid.

* * * * *